E. D. GILBERT.
TOOTH SHADE GUIDE.
APPLICATION FILED DEC. 8, 1913.
1,207,895.
Patented Dec. 12, 1916.
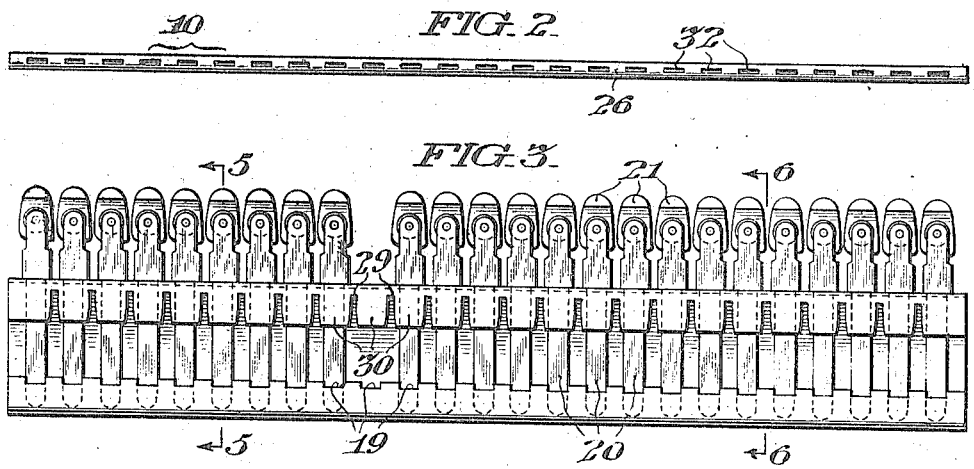
Inventor
EDMUND D. GILBERT,
By
Attorney

UNITED STATES PATENT OFFICE.

EDMUND D. GILBERT, OF PHILADELPHIA, PENNSYLVANIA, ASSIGNOR TO THE S. S. WHITE DENTAL MANUFACTURING COMPANY, A CORPORATION OF PENNSYLVANIA.

TOOTH SHADE-GUIDE.

1,207,895.

Specification of Letters Patent.

Patented Dec. 12, 1916.

Application filed December 3, 1913. Serial No. 805,285.

*To all whom it may concern:*

Be it known that I, EDMUND D. GILBERT, a citizen of the United States, and a resident of the city of Philadelphia, county of Philadelphia, State of Pennsylvania, have invented certain new and useful Improvements in Tooth Shade-Guides, of which the following is a specification, reference being had to the accompanying drawings.

My invention relates particularly to that class of dental devices commonly known as tooth shade-guides, and employed by dentists in determining by comparison the particular shade of artificial stock teeth that may be substituted for the natural teeth of the patient.

The principal object of my invention is, to provide a simplified and inexpensive holder for sample teeth, which may be constructed of a single piece of sheet material, formed to provide means for individually engaging removable tooth mountings by such pressure as to prevent their accidental displacement, but to readily permit their manual removal from said holder.

My invention also provides such a sample tooth holder with rolled or flanged longitudinal edges, respectively having spaced apertures forming guides for receiving the tooth mountings, and so alined as to insure a uniform parallelism between said mountings.

My invention, specifically stated, includes a sample tooth holder formed of a strip of sheet material having its opposite edges notched and folded to form hollow channels along the opposite edges of the formed structure, and providing guides and retainers for the respective tooth mountings.

My invention further comprehends all of the various novel features of construction and arrangement hereinafter more definitely specified.

In the accompanying drawings, Figure 1 is a front elevational view of a tooth shade-guide embodying a convenient form of my invention and showing a series of sample teeth and their mountings supported in the holder; Fig. 2 is a plan view of the structure shown in Fig. 1, with the teeth and their carriers removed; Fig. 3 is a rear elevational view of the structure illustrated in Fig. 1, showing all but one of the teeth in the holder; Fig. 4 is an enlarged front elevational view of the tooth and its mounting removed from Fig. 3; Fig. 5 is a transverse sectional view taken through the holder and tooth mounting on the line 5—5 in Fig. 3, showing the tooth in elevation for convenience of illustration; and Fig. 6 is a transverse vertical sectional view taken through the holder on the line 6—6 in Fig. 3, between adjacent teeth.

In said figures the holder is formed of a plate or strip 10 of sheet material, preferably metal, having its longitudinal margins bent to form hollow channels 11 and 12 respectively extending along the opposite longitudinal edges of the holder structure.

The channel 11 may be formed by swaging or bending the lower margin of the strip outwardly into offset relation with the plate 10 to form its front wall 13, inwardly to form its bottom wall 14, upwardly to form its rear wall 15, and forwardly to form its top wall 16, the free edge 17 of said strip being abutted against its rear surface and being provided with suitably spaced notches or recesses 19 arranged to form apertures for receiving the lower ends of the tooth mountings 20 of the sample teeth 21.

The channel 12 is formed by swaging or bending the upper margin of the strip outwardly into offset relation with the plate 10 to form its front wall 25, inwardly to form its top wall 26, and downwardly to form its rear wall 27. The free edge 28 of the margin forming the wall 27 is provided with suitably spaced notches or recesses 29 forming a series of spring fingers 30, which are inclined or sprung inwardly at their lower extremities to frictionally engage the respective tooth mountings 20, which may be thrust through suitably spaced apertures 32 in the upper wall of the channel 12 and entered into the apertures 19 to a depth limited by the shoulders 33 on said mounting, said apertures 32 being in registry with the respective spring fingers and in alinement with the apertures formed by the notches 19 in the upper wall 16 of the channel 11.

It will be readily seen by the arrangement above described, that the tooth mountings 20 may be readily inserted and removed from the holder, and when inserted are frictionally held by the spring fingers 30 in engagement with the rear surface of the plane wall 35 which connects the offset or bulged walls 13 and 25 of the respective channels 11 and 12, and which forms one side of the apertures formed by the notches 19, whereby said mountings are frictionally prevented from accidental displacement, but may be readily removed by the operator when required to be compared with the natural teeth of the patient.

I do not desire to limit my invention to the precise details of construction and arrangement herein set forth, as it is obvious that various modifications may be made therein without departing from the essential features of my invention as defined in the appended claims.

Having thus described my invention, I claim:

1. A tooth shade-guide for artificial teeth, comprising a holder formed of a strip of sheet material having its longitudinal margins folded over and its edges recessed to provide guiding and retaining means respectively for removably supporting tooth mountings.

2. A tooth shade-guide for artificial teeth, comprising a holder formed of a strip of sheet material having its longitudinal margins folded to form a hollow edged structure, one edge having apertures through which the tooth mountings may be thrust and frictionally retained by the tension of said folded margin, and the other edge having apertures for maintaining said mountings parallel.

3. A tooth shade-guide for artificial teeth, comprising a holder formed of sheet material having its margins folded to form a hollow edged structure, the edges of one of said margins being provided with notches forming means for frictionally retaining the individual tooth mountings, in parallel relation.

4. A tooth shade-guide for artificial teeth, comprising a holder formed of sheet material having its longitudinal margins folded to form a hollow edged structure, one of said margins being recessed to receive the tooth mountings, and the other margin being notched to form fingers for individually engaging said tooth mountings.

5. A tooth shade-guide for artificial teeth, comprising a holder formed of sheet material having hollow edges provided with a series of apertures for receiving the tooth mountings, and having notches providing means integral with one of said edges for frictionally retaining said tooth mountings in said holder.

6. A tooth shade-guide for artificial teeth, comprising a holder formed of sheet material having its longitudinal margins offset and folded to form a hollow edged structure, provided with perforations through which the tooth mountings may be thrust, and projections from one of said edges yieldingly engaging said mountings to retain them in position in said holder.

7. A tooth shade-guide for artificial teeth, comprising a holder formed of sheet material having its longitudinal margins offset, notched in staggered relation to each other and turned rearwardly inward to provide suitable retaining means yieldingly engaging the tooth mountings, and retaining them in parallel relation.

8. A tooth shade-guide comprising a holder for sample teeth, said holder being formed of a single strip of sheet material having its longitudinal edges notched and folded to form a hollow edged structure, the upper edge of said holder thus formed being provided with a series of apertures through which the tooth mountings may be thrust into the notches in the lower edge of said strip, the projections formed by the notches in the upper edge of the strip being sprung inwardly to yieldingly engage said mountings.

In witness whereof, I have hereunto set my hand this 4th day of December, A. D., 1913.

EDMUND D. GILBERT.

Witnesses:
WM. E. DUDLEY,
CLARENCE M. DUDLEY.